United States Patent [19]

Montoya

[11] 4,299,168
[45] Nov. 10, 1981

[54] RESISTANCE AFTER FIRING PROTECTED ELECTRIC MATCH

[75] Inventor: Arsenio P. Montoya, Albuquerque, N. Mex.

[73] Assignee: The United States of America as represented by the United States Department of Energy, Washington, D.C.

[21] Appl. No.: 132,356

[22] Filed: Mar. 20, 1980

[51] Int. Cl.³ .............................................. F42C 13/00
[52] U.S. Cl. ............................................... 102/202.11
[58] Field of Search .............. 102/28 R, 28 EB, 28 M

[56] References Cited

U.S. PATENT DOCUMENTS

| | | | |
|---|---|---|---|
| 3,048,507 | 8/1962 | Zebree | 102/28 M |
| 3,332,350 | 7/1967 | Morfy . | |
| 3,415,189 | 12/1968 | Treyorrow | 102/28 M |
| 3,587,467 | 6/1971 | Menke et al. | 102/28 M |
| 3,640,223 | 2/1972 | Olsson | 102/28 M |
| 3,717,096 | 2/1973 | Ward . | |
| 3,910,188 | 10/1975 | Stevens | 102/28 M |
| 4,152,988 | 5/1979 | Haas et al. | 102/28 M |

*Primary Examiner*—Peter A. Nelson
*Attorney, Agent, or Firm*—George H. Libman; Dudley W. King; Richard G. Besha

[57] ABSTRACT

An electric match having electrical leads embedded in flame-producing compound is protected against an accidental resistance across the leads after firing by a length of heat-shrinkable tubing encircling the match body and having a skirt portion extending beyond the leads. The heat of the burning match and an adjacent thermal battery causes the tubing to fold over the end of the match body, covering the ends of the leads and protecting them from molten pieces of the battery.

7 Claims, 2 Drawing Figures

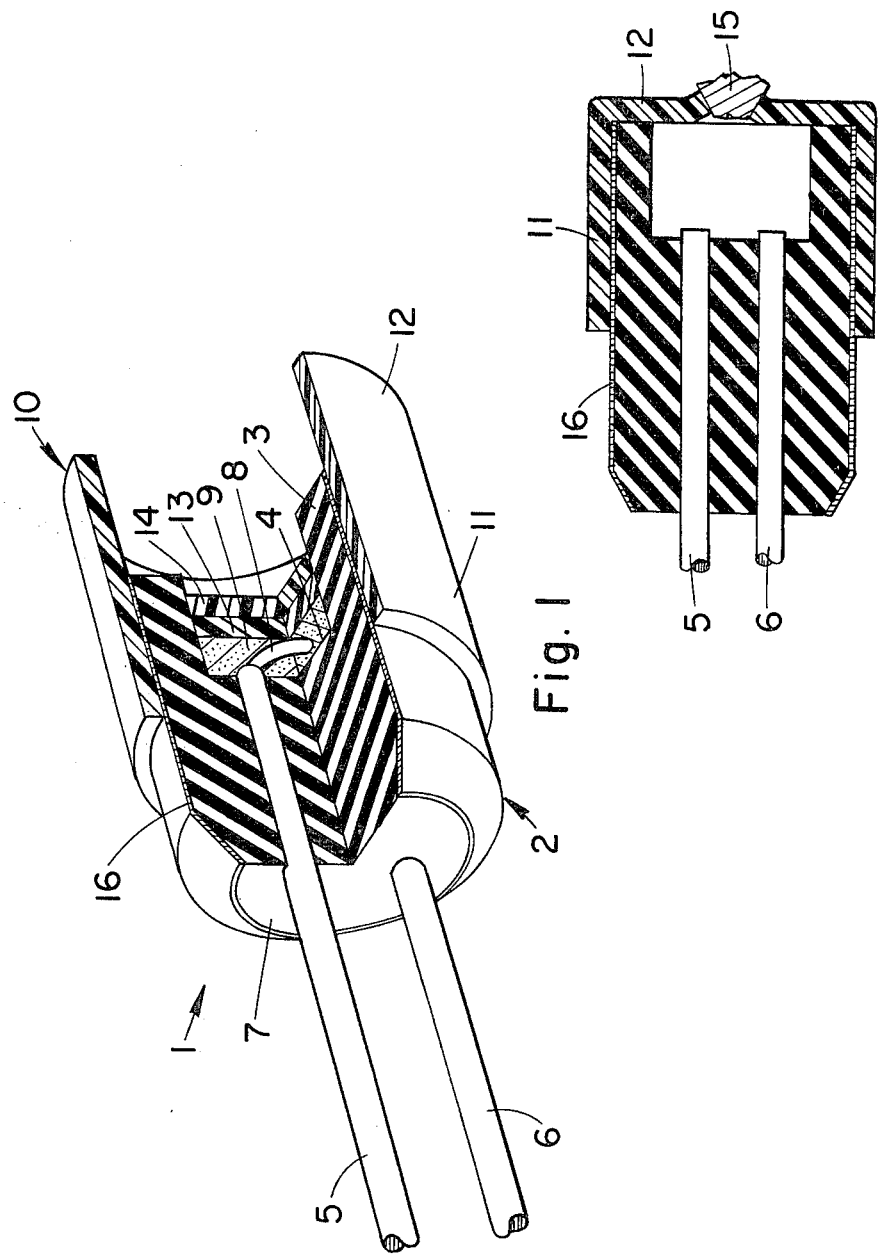

# RESISTANCE AFTER FIRING PROTECTED ELECTRIC MATCH

The United States Government has rights in this invention pursuant to Contract No. DE-AC04-76DP00780 between the Department of Energy and Sandia Corporation.

BACKGROUND OF THE INVENTION

The present invention relates generally to electric matches and more particularly to an electric match protected against external resistance after firing by a length of heat-shrinkable tubing.

The electric match or ignitor is a well-known initiator of thermal batteries. These batteries, designed for applications requiring long shelf life, rapid activation and relatively high current for a relatively short operating life, have a heat producing compound such as iron/potassium perchlorate adjacent an electrolyte such as a lithium chloride/potassium chloride eutetic. Examples of thermal batteries are shown in U.S. Pat. No. 3,558,363 of P. J. Franklin and U.S. Pat. No. 3,677,822 of D. M. Bush. The Franklin patent discloses a thermal cell having a single layer each of electrolyte and heat compound, and an electric match positioned in contact with the heat compound. The Bush patent discloses a thermal battery having a stack of alternating layers of electrolyte and heat compound, a combustible fuze strip extending along the stack, and an electric match disposed adjacent an end of the fuze strip. The operation of both batteries is similar in that a burst of flame from the match ignites the heat compound which burns at the proper temperature and rate to melt the electrolyte, thereby activating the battery.

Although many types of matches have been used with thermal batteries, the recent trend has been towards matches of the type shown in U.S. Pat. No. 3,906,858 of J. R. Craig et al. These matches have a solid cylindrical body with a cavity at one end for ignition powder, electrical leads extending through the body to the cavity and a bridgewire across the leads in contact with the ignition powder. In addition to small size and rugged construction, matches of this type permit the selection of ignition powder and bridgewire so that only an intentional large current will ignite the device, while an accidental smaller current will not.

Tests of matches having a body shape similar to the body of the Craig patent and using titanium/potassium perchlorate powder show these matches can withstand a current of one amp, 1 watt for 5 minutes without firing, yet fire within three milliseconds upon application of the designed firing current of three and one half amps. The flame produced by the matches has been observed on film to extend over thirty inches from the match, with the ignition producing sufficient force to blow away the sealing cover placed over the end of the match.

The ignition powder of an electric match burns without leaving a significant residue and the resistive wire is consumed by the heat of the electric current and the match. Accordingly, after ignition the match consists of only the body and the electrical leads.

However, the thermal battery creates a significant residue, consisting principally of molten electrolyte. It has been found that a piece of this residue occasionally comes into contact with the exposed lead ends of the fired match, causing an electrical short on the match ignition circuit. This unexpected short circuit may adversely effect the performance of the equipment which energized the battery.

SUMMARY OF THE INVENTION

It is an object of this invention to provide an electric match which will not be shorted out by the residue of a thermal battery after ignition.

It is another object of this invention to provide an improved electric match that offers a significant increase in protection to its associated circuitry at an insignificant increase in cost and time of production.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the electric match of this invention may comprise a generally conventional electric match of the type shown by Craig et al, but having a length of heat-shrinkable tubing carried by the match body with a skirt portion projecting beyond the flame-producing end of the match body. After this improved match is ignited, heat from the match flame and the adjacent thermal battery causes the projecting portion of the tubing to fold over the open end of the cavity, thereby substantially covering or closing the body end and preventing or minimizing residue from the battery from entering the housing and objectionably shorting the electrical leads of the match.

BRIEF DESCRIPTION OF THE DRAWINGS

The accompanying drawings, which are incorporated in and form a part of the specification, illustrate an embodiment of the present invention and, together with the description, serve to explain the principles of the invention.

FIG. 1 shows a cut-away perspective view of an electric match including the improvement of this invention before the match has been fired.

FIG. 2 shows the electric match of FIG. 1 after it has been fired.

DETAILED DESCRIPTION OF THE INVENTION

In FIGS. 1 and 2, electric match 1 includes a right-circular cylindrical body 2 of alumina ceramic material having a cavity extending from a flame-producing end surface 3 to a bottom surface 4. The circumference of body 2 is strengthened by metallized coating 16. Electrical leads 5 and 6 extend through body 2 from the other end surface 7 and terminate near bottom surface 4 within the cavity. A short length of Tophet C nichrome resistive wire 8 having a resistance of about 1 ohm is connected across the ends of leads 5 and 6. A quantity of titanium/potassium perchlorate igniting powder 9 is compacted around wire 8 in the cavity of body 2. Powder 9 is retained in body 2 by teflon disk 13 and silicone/elastomer moisture seal 14.

As stated previously, electric match 1 can be mounted within a thermal battery adjacent a combustible heat compound. When an electric voltage is applied by an ignition circuit to the free ends of leads 5 and 6, current passes through and heats wire 8 to a temperature sufficient to ignite powder 9, which burns extremely rapidly to produce a burst of flame extending from end 3 of body 2. This flame ignites adjacent heat compound (not shown) of the thermal battery to initiate its operation as set forth in the aforementioned patents. However, it has been found that residue from the thermal battery often becomes lodged within the hollow portion of body 2 in contact with the exposed ends of leads 5 and 6. This residue places an electrically conductive load across the match ignition circuit connected to the other ends of leads 5 and 6. If, for example, the thermal battery is used to power a particular experiment on a space satellite and the electric match is ignited by a separate power supply on the satellite, an unexpected current drain caused by the residue shorting the leads of the match could be harmful to the remainder of the satellite's mission. In addition, electrical noise caused by the short circuit may induce undesirable fluctuations in other electrical components.

As shown in FIG. 1, in accordance with the invention a length of heat-shrinkable plastic tubing 10 has portion 11 covering at least a portion of the circumference of body 2 and skirt portion 12 extending beyond end 3 for a sufficient distance as discussed hereinafter. In the embodiment illustrated, tubing 10 has portion 12 extending beyond end 3 for a distance approximately equal to the radius of body 2. A particular tubing used in this embodiment is commercially available Model RNF-100, Type 2 tubing made and sold by Raychem Corporation. It is manufactured by extruding polyolefin to the shrunk diameter, subjecting it to high energy electron beam radiation and subsequently stretching it to the pre-shrunk diameter. When heated beyond its crystalline melting point, the tubing either returns to the extruded diameter while elongating or conforms snugly to the object it covers. Although the rate of shrink for this tubing is sufficient to prevent residue from entering the match, it is not so great as to impede the flame of the match.

FIG. 2 shows an improved electric match after it has ignited a thermal battery. The heat from powder 9 and the thermal battery have caused tubing 10 to fold radially inwardly over end 3 as described above. Since portion 11 is constrained by body 2, its diameter cannot change although it now grips the body more tightly. However, portion 12 elongates and shrinks or constricts to reduce by about 70% the internal diameter of the opening to body 2. The area of the opening is thus reduced by 90%. A particle of conductive residue 15 from a thermal battery is shown lodged in the opening of tubing 10, and thereby prevented from coming into contact with the exposed end of leads 5 and 6.

Experience has also shown that the match body is more susceptible to decreased resistance after firing when the battery particles have been subjected to extremely high temperature. Another benefit of the tubing of the invention is that battery particles which strike folded skirt portion 12 dissipate their energy in the tubing, reducing their temperature and increasing their resistance, even if they should contact leads 5 and 6.

Samples of the electric match of FIG. 1 were ignited in a fixture containing a mixture of thermal battery heat compound and electrolyte, thereby duplicating the worst conditions an electric match would encounter with thermal batteries. The matches were identical except that four had a length of nonshrinkable tubing and five had a length of shrinkable tubing in accordance with the invention. After firing, all of the unprotected matches has an unacceptable leakage current caused by battery particles being in contact with the ends of leads 5 and 6. Three of the protected matches showed no leakage current; the other two showed very small but acceptable leakage currents.

It should be understood that the electric matches improved by this invention may be quite small, with a typical match having a diameter at end 4 of about 0.2" and tubing 10 was arranged with skirt portion 12 extending beyond end 4 for about 0.1".

Although a specific embodiment of an electric match has been described, it should be understood that the invention contemplates the use of heat shrinkable or constrictable tubing on any electrical match having a body with a cavity at a flame-producing end and electrical leads susceptible to being shorted after the ignition material has burned away. For example, the cross section of body 2, although illustrated as a circle, could be of any configuration as long as it has a circumference with a geometry such that a length of heat-shrinkable tubing may be placed over and retained on an end having the opening as described herein. Similarly, while match 1 is illustrated with electric leads 5 and 6 entering body 2 through the other end 7, it is also contemplated that the leads could be arranged as a coaxial cable or that one lead would be sufficient if body 2 were made of a conducting material, whereby wire 8 would be connected between the one lead and the body. The only restriction on the leads is that they be electrically insulated from a metal body and each other; as long as they terminate in the hollow opening they may enter body 2 from the side or either end.

Many different heat-shrinkable tubings can be used for tubing 10. These tubings are manufactured from a large number of plastics (polyolefins, PVC), elastomers (neoprene, Vitar, Silicon) and fluorocarbons (Kynar), among other materials. Minimum shrink temperatures for commercially available tubings generally range from about 194° to about 347° F. Since the match and battery burn at temperatures above 1000° F., any heat-shrinkable tubing which operates as designed within this range may be used in the practice of the invention.

In any embodiment of the invention, the dimensions of tubing 10 are dependent upon the characteristics of the tubing and the dimensions of the housing. The only requirement is that a portion 12 of the tubing extend beyond flame-producing end 3 of the body 2 for a sufficient length to substantially cover the exposed ends of the leads when heated by the match flame and a burning battery. A longer piece of tubing was not used in the specific embodiment because such tubing would prevent the particular match from being assembled into the battery for which it was designed prior to this invention. If the battery were redesigned to accept a longer portion 12 of tubing, the protection for match 1 would be increased as there would be more shrunk tubing between the battery residue and the exposed leads.

As has been stated, the particular match discussed above is cited merely to illustrate a particular embodiment of the invention. It is an inexpensive and easy solution to an existing problem that involves slipping a length of commercially available heat-shrinkable tubing over a known electric match. It is contemplated that the use of the invention may involve components having different sizes and shapes as long as the principle, using heat-shrinkable tubing at the end of an electric match, is followed. A match so constructed will protect the ignition circuit from short circuits caused by residue of a thermal battery without adversely effecting the operation of the match. It is intended that the scope of the invention be defined by the claims appended hereto.

I claim:

1. An electric match for use in a thermal battery including a body having an outer circumference, opposed flame-producing and other outer end surfaces and a cavity extending from said flame-producing end surface to a bottom surface; at least a pair of conductive means for conducting electricity from outside said body to the cavity; a bridgewire adjacent said bottom surface interconnecting said conductive means; flame-producing means adjacent said bridgewire for ignition thereby; and a length of heat shrinkable tubing including a portion encircling said outer circumference and a normally open skirt portion projecting beyond said flame-producing end surface for folding radially inwardly over said surface to substantially cover said cavity and conductive means in response to heat from ignition of said flame-producing means and thermal battery.

2. The electric match of claim 1 wherein said body is a right circular cylinder.

3. The electric match of claim 2 wherein said normally open skirt portion projects beyond said flame-producing end surface a distance of about one half the diameter of said body.

4. The electric match of claim 3 wherein said conductive means comprise spaced electrical leads extending from said other end surface through said body to the cavity.

5. The electric match of claim 4 wherein said body is alumina ceramic, said bridgewire is nichrome and said flame-producing means is titanium/potassium perchlorate powder.

6. The electric match of claim 5 wherein said powder is restrained in said cavity by a teflon disk and a silicone elastomer moisture seal.

7. The electric match of claim 6 wherein the diameter of said body is less than 0.2 inch.

* * * * *